United States Patent [19]
Goebel

[11] Patent Number: 5,267,137
[45] Date of Patent: Nov. 30, 1993

[54] HIGH-POWER POWER SUPPLY

[75] Inventor: Klaus Goebel, Rheinstetten, Fed. Rep. of Germany

[73] Assignee: Kohler, Schmid Partner, Fed. Rep. of Germany

[21] Appl. No.: 42,448

[22] Filed: Apr. 2, 1993

Related U.S. Application Data

[63] Continuation of Ser. No. 776,595, Oct. 11, 1991, abandoned.

[30] Foreign Application Priority Data

Oct. 19, 1990 [DE] Fed. Rep. of Germany ....... 4033281

[51] Int. Cl.$^5$ ............................................. H02M 7/145
[52] U.S. Cl. ....................................... 363/87; 363/69; 363/129; 323/284
[58] Field of Search ..................... 363/3, 62, 65, 69, 70, 363/87, 89, 92, 128, 129; 323/222, 268-272, 282, 284-285

[56] References Cited

U.S. PATENT DOCUMENTS

| | | | |
|---|---|---|---|
| 2,340,098 | 12/1941 | Zuhlke | 175/364 |
| 3,643,150 | 2/1972 | Bulleyment | 321/5 |
| 4,270,166 | 5/1981 | Immler | 363/89 |
| 4,488,211 | 12/1984 | Miyairi | 363/45 |
| 4,739,466 | 4/1988 | Glennon et al. | 363/89 |
| 4,805,082 | 2/1989 | Heinrich | 363/129 |
| 4,821,166 | 4/1989 | Albach | 363/89 |
| 4,866,591 | 9/1989 | Cook et al. | 363/67 |
| 4,999,760 | 3/1991 | Tietema | 363/53 |

FOREIGN PATENT DOCUMENTS

| | | |
|---|---|---|
| 0371555A1 | 11/1989 | European Pat. Off. . |
| 0388850A2 | 9/1990 | European Pat. Off. . |
| 3524169C1 | 1/1987 | Fed. Rep. of Germany . |
| 1-286777A | 11/1989 | Japan . |
| WO88/05224 | 7/1988 | PCT Int'l Appl. . |

OTHER PUBLICATIONS

"Veritron/Stromrichtergerate", BBC Brown Bovery Company Publication, Publication No. DGHS 50466D, 1975/76.

Primary Examiner—Steven L. Stephan
Assistant Examiner—Adolf D. Berhane
Attorney, Agent, or Firm—Cesari and McKenna

[57] ABSTRACT

The invention concerns a high power power supply with output power in excess of 5 kilowatts, by way of example, for the supply of electromagnets in the area of electromedicine and nuclear physics. In order to regulate the output current, power thyristors 28 are utilized within the two bridge rectifier circuits 2 and 3, operated with phase control regulation. In order to keep the output current constant, two transistor final control elements 10 and 11 regulated by a control-gain amplifier are used. Two charging capacitors 6 and 7 are provided for energy storage, the capacity of which is sufficiently large that the commutation of the power thyristors 28 transpires by means of self-extinguishing in a currentless state, whereby conducted as well as irradiated electrical interferences are eliminated.

30 Claims, 3 Drawing Sheets

HIGH-POWER POWER SUPPLY

This is a Request under the File Wrapper Continuing application procedure, 37 C.F.R. §1.62, for filing a continuation of the prior complete application Ser. No. 07/776,595, filed on Oct. 11, 1991, entitled HIGH-POWER POWER SUPPLY, now abandoned.

FIELD OF THE INVENTION

The invention concerns a high power power supply for power in excess of five kilowatts to transform a three phase alternating current into a direct current for the purpose of producing an adjustable highly constant direct current, with a three phase matching and isolation transformer followed by at least one regulatable bridge rectifier exhibiting power thyristors, with a phase controlled regulation of the power thyristors, and with at least one charging capacitor at the output of the bridge rectifier circuit.

The invention can be applied to high power power supplies of the kind used to supply electromagnets in the areas of electro-medicine and nuclear physics.

DESCRIPTION OF THE PRIOR ART

The coils of large resistive electromagnets require high electrical power for their current supply, lying in the range between 10 and 500 kilowatts. The direct currents, which lie in the range of several hundreds of amperes, must be regulatable, extremely constant, and exhibit minimum ripple. The current stability and the voltage ripple should be in the ppm range.

Normally the energy necessary for large electromagnets is extracted from the usual three phase supply power by means of a matching and isolation transformer followed by a rectifying circuit. The desired highly constant output current necessitates a very wide band pass and highly amplifying regulation system along with the corresponding measurement devices. These requirements are, in connection with the corresponding regulation amplifications, satisfied by linear regulators whose transistor final control element contains power transistors.

Should, within the rectifier circuit, thyristors with adjustable utilization of the sine-shaped power voltage by means of phase controlled regulation be used for the regulation and/or adjustment of the electrical power within the predetermined limits of the electromagnets given by the operation conditions, then inadequately suppressible electrical interferences at various frequencies often result locally, distributed over the entire power network, and radiated into the surroundings which, in particular, effect the regulation system and thereby interfere with the achievement of the stability of the output current unavoidably necessary for operation as well as with the performance of apparatuses in the vicinity.

The cause of the electrical interference is the discontinuous operation of the power converter regardless if one is dealing with diodes or thyristors. In addition to distortion with whole number multiples of the power frequency, the shutting on and off procedure of the semiconductors results in high frequency switching spikes. While the low frequency currents interfere conductively with the surroundings, the high frequency currents are radiated in the form of interfering electromagnetic fields by means of magnetic construction elements and as well as by short conducting pieces. In this connection thyristors are, in particular, especially disruptive since the current through the semi-conductor valves is not extinguished immediately at the zero point crossing, rather continues to initially flow even for negative voltage values until the bases zone is free of charge carriers and the off-state voltage can be established—there exists a recovery effect. The commutation problems which result in consequence thereof cause the interferences referred to. In conventional thyristor circuits, with large current flow in one phase, another phase with a large differential voltage is fired and the current conducting rectifier is effectively closed from behind. The extremely steep off-commutation leads to a long reverse recovery. Nearly short circuit conditions reign until the blocking capability is developed.

It is known in the art that a storage choke of very large inductance is always connected between the bridge rectifier circuit and the load in order to smooth the current pulse and to isolate the rapid voltage changes from the load. Significant capacitance is first located following the storage inductor on the load side for filtering purposes. A typical circuit of a power converter in six pulse application can be found, by way of example, in the company-publication "Thyristors in Technical Application, Vol. 2: Network Guided Power Converters; Siemens AG, Author: G. Möltgen, 1967", in particular, FIG. 72 on page 103 with the accompanying description.

The characteristics of power thyristors are by way of example described in the company publication "Power Semiconductors: Network Thyristors Data Book 1989/90 (Siemens AG)", in particular, on the pages starting with page 26.

Even the utilization of thyristors on the primary side of the matching and isolation transformer does not solve the problem. The local interfering fields are reduced in strength since the contribution radiated by means of the stray inductance of the power transformer is eliminated. However, the stray inductances of the feed conductors and the conductor resistivities and/or the corresponding magnitudes of the up-stream transformers now constitute the limiting elements; in this manner the high frequency interferences are distributed over the entire power network.

For the reasons given, up to this point only mechanically adjustable variable transformers have been utilized for power regulation such as, by way of example, the power supplies of the applicant of the type B/MN 250/310 A which, however are limited with respect to rapid adjustability and exhibit increased weight, space requirements, and production costs.

The purpose of the invention consists in the conceptualization of a high power power supply with which, using thyristors, it is possible to achieve a power regulating current stability of 1:100,000 and largely eliminate high frequency interference.

BRIEF SUMMARY OF THE INVENTION

In achieving this purpose, one starts from a high power power supply with power in excess of five kilowatts for the transformation of a three phase alternating voltage into a direct voltage to produce an adjustable highly constant direct current, with a three phase matching and isolation transformer followed by at least one regulatable bridge rectifier exhibiting power thyristors, with phase controlled regulation of the power thyristors, and with at least one charging capacitor at the output of the bridge rectifier circuit. The purpose of the invention is achieved in that the capacitance C of the charging capacitor is dimensioned to be sufficiently large that the commutation of the power thyristors transpires through self-extinguishing in a largely currentless state and during the commutation time, the direct current is delivered largely exclusively by the charging capacitor.

The inventive concept lies essentially therein that, completely contrary to common usage where, in the operation of the bridge rectifiers configured with thyristors an as uniform as possible current extraction is strived for by means of a highly inductive charging choke, one requires that the current in one phase is as close to zero as possible before one switches to the next subsequent phase. In this manner it is possible to essentially eliminate the commutation short circuits causing the strong high frequency interferences. One intentionally avoids the normally used highly inductive choke as an energy storage means—the large charging capacitor proposed in accordance with the invention provides, in this case, the energy storage. This charging capacitor, with its very high capacitance, must be capable of briefly delivering the entire output current, by way of example, six times during one period of the alternating current power.

In accordance with a further feature of the invention, the ratio to the energy stored in the charging capacitor to the energy in the inductive components such as the stray inductance or the matching inductance of the three phase matching and isolation transformer is at least 100:1. The stray inductance of the matching and isolation transformer must, together with the remaining inductances, be kept sufficiently small such that, despite the necessary large capacitance of the charging capacitor, sufficiently short and powerful charging pulses occur so that, before the phase voltage sinks below the capacitor voltage, the storage of capacitive energy is sufficiently large for every current pulse. The upstream three phase matching and isolation transformer, contrary to normal practise, does not exhibit a significantly large stray inductance but rather has as small a stray inductance as possible.

When connecting a high power power supply in accordance with the invention onto a three conductor alternating current network with a frequency of 50 Hertz, an output power of 40 kilowatt, a required DC voltage of 100 volts, and an extractable DC current of 400 amperes, it is necessary that the charging capacitor exhibit a capacitance of at least 10,000 microfarads. Such a dimensioning allows for the self-extinguishing operation in accordance with the invention to establishes itself in the bridge rectifier circuit containing the thyristors so that the circuit can operate similar to that of (unregulated) rectifying diodes. Since the off-commutation steepness of the charging current is small (less than 1 A/μsec.), the undesired high frequency contamination of the high power power supply surroundings remains in acceptable limits.

In order to limit the rise of the bridge rectifying circuit charging capacitor charging current it can be advantageous to incorporate a downstream limiting choke whose inductance, including all stray inductances, is less than 1 millihenry. In this fashion the self-extinguishing operation can be just maintained.

An advantageous realizable embodiment of the invention is effected when, in a high power power supply, the three phase matching and isolation transformer has six secondary windings from which three are in a delta and three in a Y configuration, with the Y and delta circuit secondary windings connected to one each of two equally dimensioned six pulse bridge rectifier circuits equipped with power thyristors, with the outputs of both bridge rectifier circuits beach being connected to one of two equally large charging capacitors, and each bridge rectifier circuit being regulated by a suitable thyristor regulator, with both charging capacitors connected in parallel by means of two transistor final control elements, and the transistor final control elements are incorporated in the corresponding current path of the direct current and are regulated via a controlled-gain amplifier. Here, each of the delta and Y bridge rectifier connected circuits affects one of two independent charging capacitors whereby the two initially separate output currents are joined into a combined output current in a manner sufficiently free from feedback coupling with the assistance of the transistor final control element. This circuit is chosen since otherwise 12 charging pulses must be divided within a period of the network frequency and 12 currentless phases must be maintained, whereby the load on the charging capacitors would increase very strongly.

Clearly, in order to obtain high DC currents two fully independent bridge rectifier circuits, each with its corresponding charging capacitor, can be connected in series.

Each charging capacitor associated with one of the two bridge rectifying circuits can be dimensioned in accordance with the following rule of thumb:

$$C > \frac{0,05 \times P}{\frac{U^2}{2} \times f}$$

whereby P is the output power in watts, U is the output voltage in volts, f is the frequency of the three phase power network in Hertz and C the capacitance of the charging capacitor in farads.

An embodiment of the invention is described in greater detail below with reference to the accompanying drawings.

DETAILED DESCRIPTION OF THE PREFERRED EMBODIMENT

Figure 1:
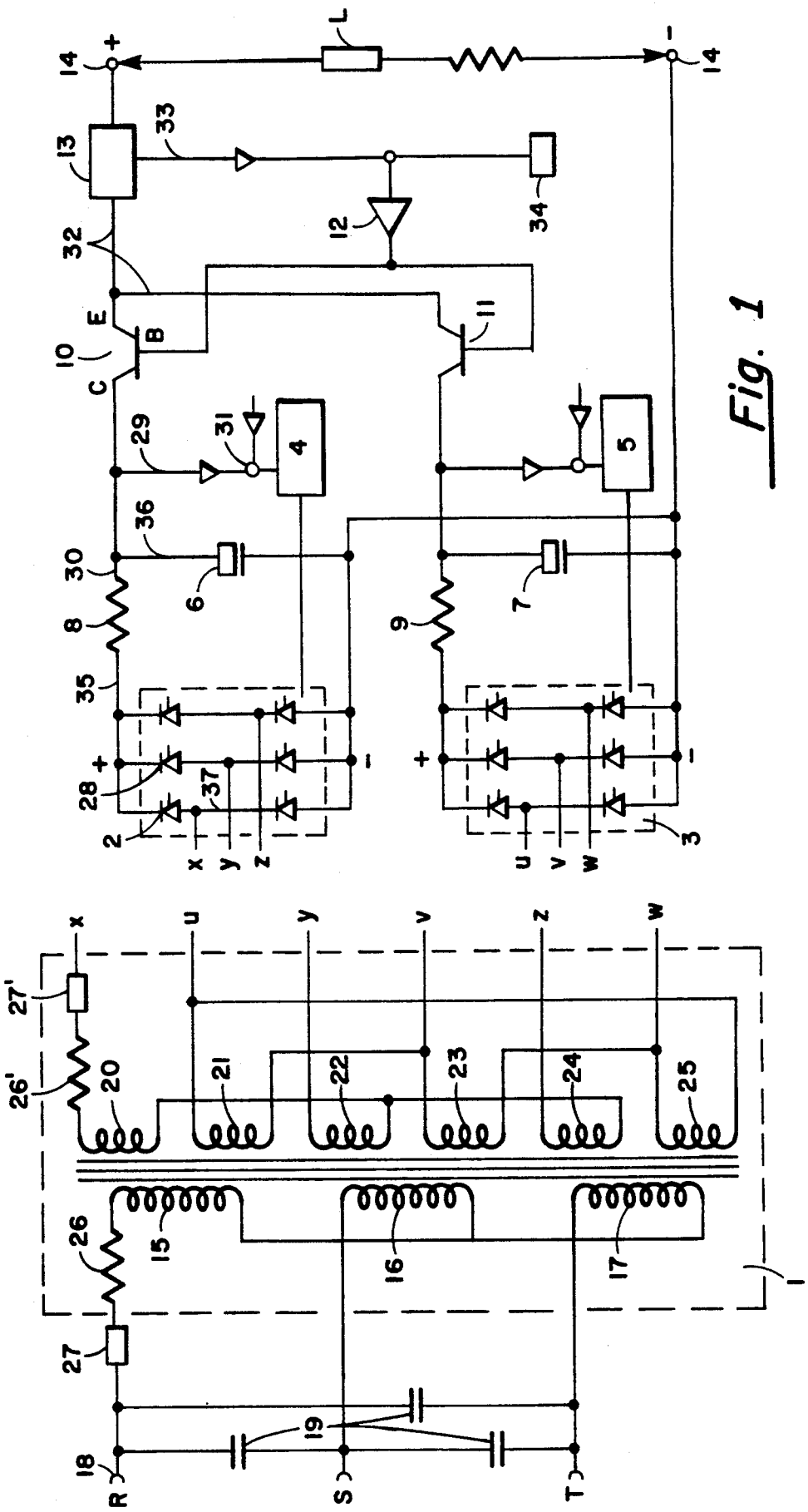
FIG. 1 Circuit diagram for a 12 pulse high power power supply with an output power of approximately 40 kilowatts.

FIG. 1 contains the circuit diagram for a 12 pulse high power power supply with an output power of approximately 40 Kilowatts. The high power power supply essentially includes the following construction elements and/or construction groups:

A three phase matching and isolation transformer 1, a bridge rectifying circuit 2 in Y configuration, a bridge rectifier circuit 3 in delta configuration, a first thyristor regulation 4 for the bridge rectifier circuit 2 in the Y configuration, a second thyristor regulation 5 for the bridge rectifier circuit 3 in the delta configuration, a first charging capacitor 6, a second charging capacitor 7, a first limiting choke 8, a second limiting choke 9, a first transistor final control element 10, a second transistor final control element 11, a control-gain amplifier 12, and a current measurer 13.

On the output terminals 14 of the high power power supply is a mixed resistive/inductive load L, by way of example, the electromagnet of a nuclear spin tomograph.

The three phase matching and isolation transformer contains three equal primary windings 15, 16 and 17 in Y configuration. The input terminals 18 of these primary windings 15, 16, 17 are connected to the three phases R, S, T of a three phase current network and are bridged through three capacitors 19 which compensate for blind current and short-circuit interferences of higher frequency.

The three phase matching and isolation transformer 1 further includes a total of 6 equal secondary windings 20, 21, 22, 23, 24 and 25 from which a first group 20, 22 and 24 is connected in Y configuration and a second group 21, 23 and 25 in delta configuration. 26 and 26' indicate the stray inductances and 27, 27' the resistive winding resistances of all primary and secondary windings including iron losses.

The two bridge rectifier circuits 2 and 3 are identically built and configured with equal power thyristors 28. The two thyristor regulators 4 and 5 provide the phase controlled power regulation of the power thyristors 28 of the bridge rectifier circuits 2 and 3. The three bridge branches x, y, z and u, v, w are connected to the respective free terminals x, y, z and u, v and w of the two groups of secondary windings 20 to 25 respectively.

The thyristor regulators 4 and 5 regulate the power thyristors 28 synchronously with the frequency f of the three phase current network; towards this end they are fed (in a manner not shown) a fraction of the voltage of the three phase current network. As control input, the prevailing voltage is fed by means of the control conductor 29 to the final control element 10 which functions as a fine control element and is compared to a reference voltage at junction 31.

The two charging capacitors 6 and 7 are parallel to the respective outputs of the bridge rectifier circuits 2 and 3. The two charging capacitors 6 and 7 are two large batteries of capacitors which consist of parallelly connected electrolytic capacitors with an operating voltage of approximately 200 volts to effect an entire capacitance of, by way of example, 60,000 microfarads.

The two limiting chokes 8 and 9 are connected downstream of the bridge rectifier circuits 2 and 3, lying in the positive current path 30 leading to the charging capacitors 6 and 7. The inductances of the limiting inductors 8 and 9 are each smaller than, by way of example, 0.5 millihenrys. The limiting chokes 8 and 9, together with the stray inductances 26 of the primary and secondary windings 15 to 17 and 20 to 25 of the three phase matching and isolation transformer 1, provide an upper limit to the rise time of the charging capacitor 6 and 7 charging pulses. Depending on the stray inductances the limiting inductors 8 and 9 can also be eliminated.

The transistor final control elements 10 and 11 consist of parallel connected groups of conventional bipolar power transistors from which only one of each is represented. The ends of the two positive current paths 30 are connected to the corresponding collectors C and a common output conductor 32 is connected to both of the two emitters E of the power transistors to combine the output currents into a total output current which flows through the current measure and ends on the positive output terminal 14.

The control-gain amplifier 12 is introduced between a measurement output 33 of the current measurer and the output conductor 32, connected to the bases B of both power transistors. It is a direct current amplifier with a amplification factor on the order of 100,000. By means of the measuring output 33, the control-gain amplifier 12 is fed with a voltage derived from the output current by means of, by way of example, an auxiliary resistance. Furthermore, an extremely constant direct voltage produced by an external voltage source 34 is available as a reference voltage at the input of the control-gain amplifier 12. Further description of the function of the high power power supply is not required since said functioning is familiar to the one of skill in the art utilizing the depicted circuit diagram.

The time variation of the current in various conducting sections is represented in FIGS. 2a, 2b, 2c and 3 over a period of the alternating current network, in an exemplary fashion, for a six pulse high power power supply in accordance with the invention or for one half of the 12 pulse high power power supply apparatus represented in FIG. 1.

Figure 2A:
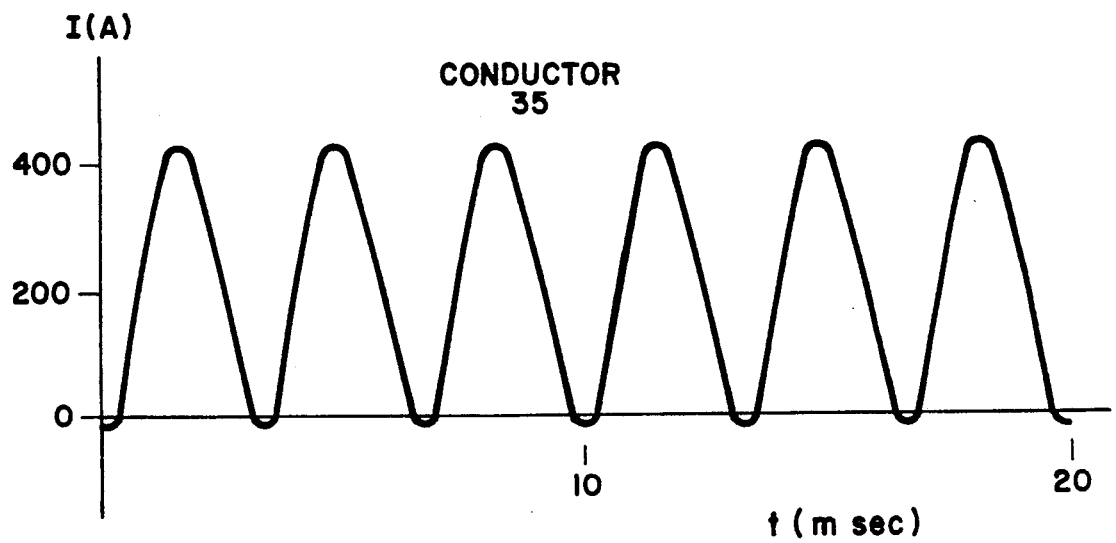
FIG. 2a Total current flowing in conductor 35 downstream of the bridge rectifier circuit 2.

FIG. 2a shows the total current flowing in the conductor 35 that is to say following the bridge rectifier circuit 2. Over a period, by way of example 20 ms, the three power thyristor pairs 28 are sequentially fired and supply six current pulses. Subsequent power thyristor pairs are first fired when the current through the preceding one has fallen at least approximately to zero, that is to say, the commutation transpires in an essentially currentless state. Thereby the characteristic reverse current spikes of thyristor circuits are largely eliminated. The remaining rise and fall times of the current pulses, have largely uncritical time constants. For approximately equal rise and fall times, each maximum current is achieved within approximately 1.4 ms. Even with charging current peaks of, by way of example, 500 A charging current off-commutation times of less than 0.3 amperes per microsecond result, which approximately corresponds to the times of an unregulated rectifier with solid-state diodes. If necessary, a small limiting choke 8 can be utilized to limit the rise times to the 1.4 ms mentioned at full load.

Figure 2B:
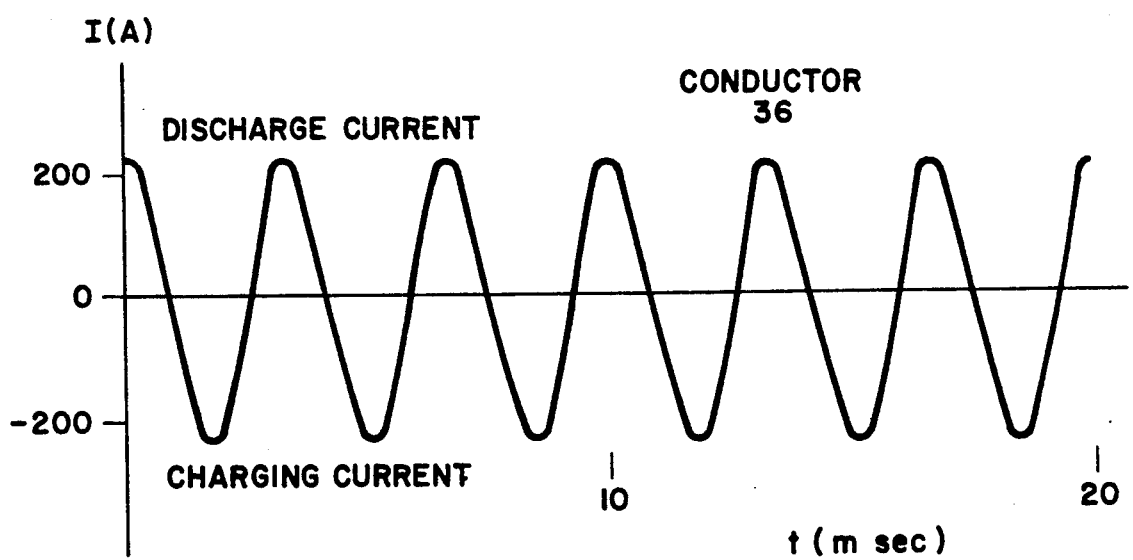
FIG. 2b Total current to and from the charging capacitor 6 as measured in conductor 36.
Figure 2C:
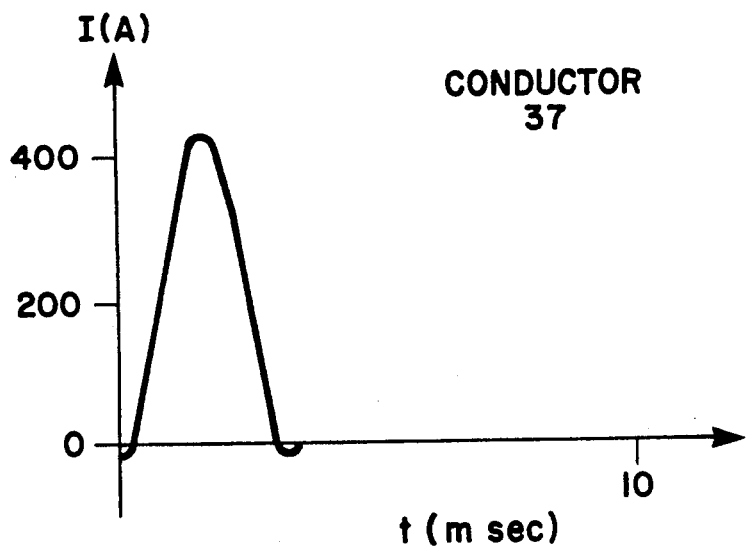
FIG. 2c Current in conductor 37 according to the invention.

The total current to and from the charging capacitor 6 is represented in FIG. 2b, as measured in conductor 36. There are positive discharge pulses and negative charging pulses which are temporarily coincident with the gaps between the current pulses in FIG. 2a. FIG. 2c shows the current in conductor 37. In accordance with the invention, no large negative reverse currents are seen.

Figure 3:
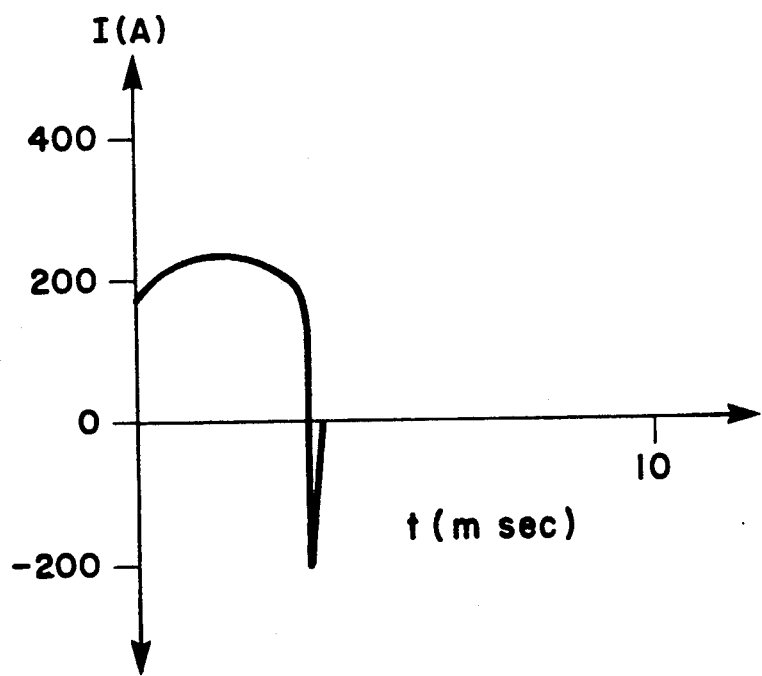
FIG. 3 Current analogous to FIG. 2c but according to prior art.

FIG. 3 shows, in a representation analogous to FIG. 2c, the temporal current dependence which results when the commutation, according to prior art, does not transpire in a currentless state. Sharp current peaks occur, leading to the unacceptable interferences. In contrast to the situation in FIG. 2, in FIG. 3, the limiting choke 8 was introduced with a large inductance value of prior art.

SUMMARY OF THE UTILIZED REFERENCE SYMBOLS 1 three phase matching and isolation transformer
2 bridge rectifier circuit
3 bridge rectifier circuit
4 thyristor regulation
5 thyristor regulation
6 charging capacitor
7 charging capacitor
8 limiting choke
9 limiting choke
10 transistor final control element
11 transistor final control element
12 control-gain amplifier
13 current measurer
14 output terminals
L load
15 primary winding
16 primary winding
17 primary winding
18 input terminals
R phase
S phase
T phase
19 capacitors
20 secondary winding
21 secondary winding
22 secondary winding
23 secondary winding
24 secondary winding
25 secondary winding
26, 26' stray inductances
27, 27' winding resistances
28 power thyristors
29 regulation conductor
30 direct current path
31 junction
C collector
E emitter
32 output power
33 measuring output
B base
34 voltage source
35 conductor
36 conductor
37 conductor

I claim:

1. In a power supply for transforming three-phase alternating-current electrical power into direct-current electrical power for application to a load, said power supply having a three-phase transformer connected to said three-phase alternating-current electrical power, a first bridge rectifier circuit comprised of a first plurality of thyristors connected to said three-phase transformer, said three-phase transformer and said first bridge rectifier circuit having an inductance with a value, a first phase control regulator circuit connected to each of said first plurality of thyristors for controlling said each of said first plurality of thyristors to conduct a variable current, and a charging capacitor having a capacitance value and being connected to said first bridge rectifier circuit, the improvement wherein
said inductance value is sufficiently small to allow each of said first plurality of thyristors to periodically pass between a conducting state and a non-conducting state during a commutation time when said variable current is substantially zero and said capacitance value is sufficiently large that said charging capacitor supplies said direct current electrical power to said load during said commutation time.

2. In a power supply, the improvement according to claim 1 wherein said three-phase transformer has an inductance and said power supply has stray inductances and wherein an amount of electrical energy stored in said charging capacitor is at least one hundred times greater than an amount of electrical energy stored in said three-phase transformer inductance and said stray inductances.

3. In a power supply, the improvement according to claim 1 wherein said capacitance value is at least 10,000 microfarads.

4. In a power supply, the improvement according to claim 1, further comprising a current limiting inductor connected in series with said first bridge rectifier and said load.

5. In a power supply, the improvement according to claim 4, wherein said current limiting inductor has an inductance less than 1 millihenry.

6. In a power supply, the improvement according to claim 1, further comprising a final control element connected in series with said first bridge rectifier and said load.

7. In a power supply, the improvement according to claim 6, further comprising means responsive to a voltage appearing across said load for controlling said final control element to apply a predetermined voltage to said load.

8. In a power supply, the improvement according to claim 1, further comprising a second bridge rectifier circuit connected to said three-phase transformer and having a second plurality of thyristors;
a second charging capacitor connected to said second bridge rectifier output;
a second phase control regulator circuit connected to said second plurality of thyristors for controlling said second plurality of thyristors;
a first final control element having an input connected to said first charging capacitor and an output connected to said load;
a second final control element having an input connected to said first charging capacitor and an output connected to said load; and
a control gain amplifier connected across said load and to said first final control element and to said second final control element for controlling said first final control element and said second final control element to apply a predetermined voltage to said load.

9. In a power supply, the improvement according to claim 1 wherein said capacitance value is determined in accordance with the following equation:

$$C > \frac{0.05\ P}{\frac{U^2}{2} f}$$

where C is a magnitude of said capacitance value in farads, P is a magnitude of said direct-current electrical power in watts, U is a magnitude of a voltage applied across said load in volts, and f is a frequency of said three-phase alternating-current electrical power in Hertz.

10. A power supply according to claim 1, further comprising a current limiting inductor connected in series with said first bridge rectifier and said load.

11. A power supply according to claim 10, wherein said current limiting inductor has an inductance less than 1 millihenry.

12. A power supply for transforming three-phase alternating-current electrical power into direct-current electrical power for application to a load, said power supply comprising:
- a three-phase transformer connected to said three-phase alternating-current electrical power;
- a first bridge rectifier circuit comprised of a first plurality of thyristors connected to said three-phase transformer, said three-phase transformer and said first bridge rectifier circuit having an inductance with a value;
- a first phase control regulator circuit connected to each of said first plurality of thyristors for controlling said each of said first plurality of thyristors to conduct a variable current, wherein said inductance value is sufficiently small to allow each of said first plurality of thyristors to periodically commutate between a conducting state and a non-conducting state during a commutation time when said variable current is substantially zero; and
- a charging capacitor being connected to said first bridge rectifier circuit and having a capacitance value which is sufficiently large that said charging capacitor supplies said direct current electrical power to said load during said commutation time.

13. A power supply according to claim 12 wherein said three-phase transformer has an inductance and said power supply has stray inductances and wherein an amount of electrical energy stored in said charging capacitor is at least one hundred times greater than an amount of electrical energy stored in said three-phase transformer inductance and said stray inductances.

14. A power supply according to claim 12 wherein said capacitance value is at least 10,000 microfarads.

15. A power supply according to claim 12, further comprising a final control element connected in series with said first bridge rectifier and said load.

16. A power supply according to claim 15, further comprising means responsive to a voltage appearing across said load for controlling said final control element to apply a predetermined voltage to said load.

17. A power supply according to claim 12, further comprising a second bridge rectifier circuit connected to said three-phase transformer and having a second plurality of thyristors;
- a second charging capacitor connected to said second bridge rectifier output;
- a second phase control regulator circuit connected to said second plurality of thyristors for controlling said second plurality of thyristors;
- a first final control element having an input connected to said first charging capacitor and an output connected to said load;
- a second final control element having an input connected to said first charging capacitor and an output connected to said load; and
- a control gain amplifier connected across said load and to said first final control element and to said second final control element for controlling said first final control element and said second final control element to apply a predetermined voltage to said load.

18. A power supply according to claim 12 wherein said capacitance value is determined in accordance with the following equation:

$$C > \frac{0.05\, P}{\frac{U^2}{2} f}$$

where C is a magnitude of said capacitance value in farads, P is a magnitude of said direct-current electrical power in watts, U is a magnitude of a voltage applied across said load in volts, and f is a frequency of said three-phase alternating-current electrical power in Hertz.

19. A high-power power supply for transforming three-phase alternating-current electrical power into direct-current electrical power for application to a load, said power supply comprising:
- a three-phase transformer having a primary winding, three secondary windings connected in a delta configuration and three secondary windings connected in a wye configuration, said three-phase transformer having a transformer inductance with a value;
- a first bridge rectifier circuit having a first plurality of thyristors for conducting a first variable current, an input connected to said delta configuration and an output, said first bridge rectifier circuit having a first rectifier circuit inductance with a value;
- a second bridge rectifier circuit having a second plurality of thyristors for conducting a second variable current, an input connected to said wye configuration and an output, said second bridge rectifier circuit having a second rectifier circuit inductance with a value;
- a first thyristor regulator circuit connected to said first plurality of thyristors and responsive to said three-phase alternating-current electrical power for triggering each of said first plurality of thyristors, said transformer inductance value and said first rectifier circuit value being sufficiently low to cause each of said first plurality of thyristors to commutate between a conducting state and a non-conducting state during a first commutation time when said first variable current is substantially zero;
- a second thyristor regulator circuit connected to said second plurality of thyristors and responsive to said three-phase alternating-current electrical power for triggering each of said second plurality of thyristors, said transformer inductance value and said second rectifier circuit value being sufficiently low to cause each of said second plurality of thyristors to commutate between a conducting state and a non-conducting state during a second commutation time when said second variable current is substantially zero;
- a first charging capacitor having a first capacitance value and being connected to said first bridge rectifier output, said first capacitance value being sufficiently large that said first charging capacitor supplies said direct current electrical power to said load during said first commutation time; and
- a second charging capacitor having a second capacitance value equal to said first capacitance value and being connected to said second bridge rectifier output, said second capacitance value being sufficiently large that said second charging capacitor supplies said direct current electrical power to said load during said second commutation time.

20. A high-power power supply according to claim 19 further comprising:
   a first series transistor regulator having an input connected to said first charging capacitor and an output connected to said load;
   a second series transistor regulator having an input connected to said second capacitor and an output connected to said load; and
   a control-gain amplifier connected to said first series transistor regulator and said second series transistor regulator for controlling said first series transistor regulator and said second series transistor regulator to apply a predetermined voltage to said load.

21. A high-power power supply according to claim 20 wherein an amount of electrical energy stored in said first and said second charging capacitors is at least one hundred times greater than an amount of electrical energy stored in said three-phase transformer inductance and said stray inductances.

22. A high-power power supply according to claim 21 wherein said first capacitance value is at least 10,000 microfarads.

23. A high-power power supply according to claim 22, further comprising:
   a first current limiting inductor connected in series with said first bridge rectifier and said first charging capacitor; and
   a second current limiting inductor connected in series with said second bridge rectifier and said second charging capacitor.

24. A power supply according to claim 23, wherein said first current limiting inductor and said second current limiting inductor each have an inductance less than 1 millihenry.

25. A high-power power supply according to claim 24 wherein said first capacitance value is determined in accordance with the following equation:

$$C > \frac{0.05\,P}{\frac{U^2}{2}f}$$

where C is a magnitude of said capacitance value in farads, P is a magnitude of said direct-current electrical power in watts, U is a magnitude of a voltage applied across said load in volts, and f is a frequency of said three-phase alternating-current electrical power in Hertz.

26. A method for operating a power supply for transforming three-phase alternating-current electrical power into direct-current electrical power for application to a load, said power supply having a three-phase transformer connected to said three-phase alternating-current electrical power, a bridge rectifier circuit comprised of a plurality of thyristors connected to said three-phase transformer, said three-phase transformer and said bridge rectifier circuit having an inductance with a value, a phase control regulator circuit connected to each of said plurality of thyristors for controlling said each of said plurality of thyristors to conduct a variable current and a charging capacitor having a capacitance value and being connected to said bridge rectifier circuit, the method comprising the steps of:

A. selecting said inductance value to be sufficiently low to commutate each of said plurality of thyristors between a conducting state and a non-conducting state during a commutation time when said variable current is substantially zero; and B. selecting said capacitance value to be sufficiently large that said charging capacitor supplies said direct current electrical power to said load during said commutation time.

27. A method for operating a power supply, according to claim 26 wherein Step B comprises the step of:
   B1. selecting said capacitance value to be at least 10,000 microfarads.

28. A method for operating a power supply, according to claim 26 further comprising the step of:
   C. inserting a current limiting inductor in series with said bridge rectifier and said load.

29. A method of operating a power supply according to claim 28, wherein step C comprises the step of:
   C1. selecting said current limiting inductor to have an inductance of less than 1 millihenry.

30. A method for operating a high-power power supply according to claim 26 wherein step B comprises the steps of:
   B2. selecting said capacitance value in accordance with the following equation:

$$C > \frac{0.05\,P}{\frac{U^2}{2}f}$$

where C is a magnitude of said capacitance value in farads, P is a magnitude of said direct-current electrical power in watts, U is a magnitude of a voltage applied across said load in volts, and f is a frequency of said three-phase alternating-current electrical power in Hertz.

* * * * *

UNITED STATES PATENT AND TRADEMARK OFFICE
CERTIFICATE OF CORRECTION

PATENT NO. : 5,267,137
DATED : November 30, 1993
INVENTOR(S) : Klaus Goebel

It is certified that error appears in the above-indentified patent and that said Letters Patent is hereby corrected as shown below:

On the title page, Item [73]: Assignee; should read

--BRUKER ANALYTISCHE MESSTECHNIK GmbH--

Signed and Sealed this

Thirteenth Day of September, 1994

Attest:

BRUCE LEHMAN

Attesting Officer     Commissioner of Patents and Trademarks